Feb. 21, 1961 E. N. JACOBS 2,972,377
RAIN VISOR FOR AUTOMOBILE WINDSHIELD
Filed Feb. 29, 1960
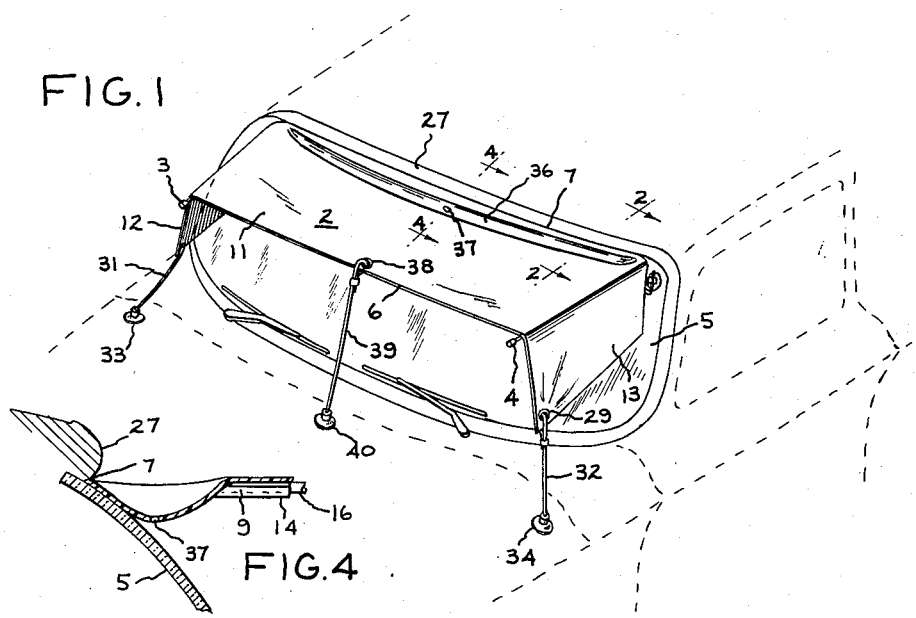
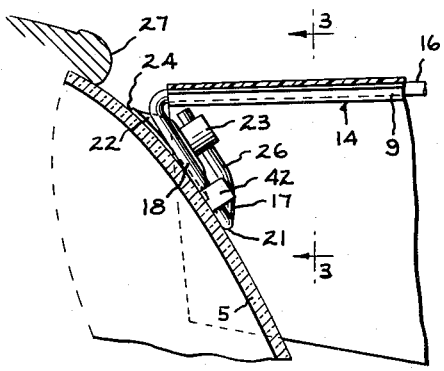
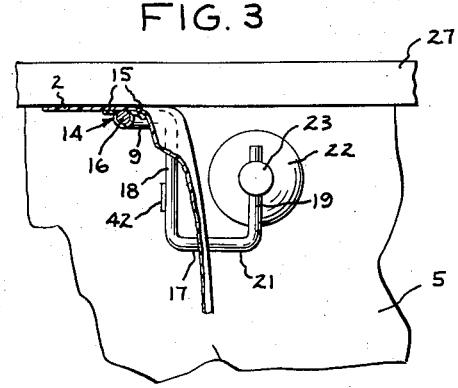
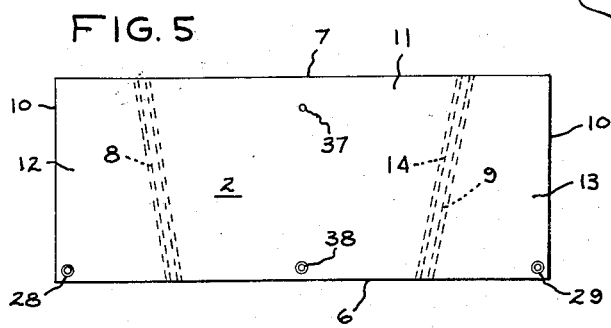
INVENTOR.
EDWIN N. JACOBS
BY
*Ferd L. Mellhoff*
HIS ATTORNEY United States Patent Office 2,972,377
Patented Feb. 21, 1961

2,972,377
RAIN VISOR FOR AUTOMOBILE WINDSHIELD
Edwin N. Jacobs, 2223 Paris Drive, Louisville, Ky.
Filed Feb. 29, 1960, Ser. No. 11,884
7 Claims. (Cl. 160—352)

The present invention relates to a rain visor for use on an automobile windshield and more particularly to a rain visor that may be quickly mounted onto or removed from an automobile windshield.

Drive-in theaters, where the patrons remains seated in automobiles during the performance of a movie have become increasingly popular in most parts of the country. Attendance at these theaters usually depends to a great extent upon the weather, as a rain storm makes it almost impossible to see the movie screen through the windshield of an automobile. That is, rain impinging upon the windshield and running down the windshield obscures the vision through the windshield of the automobile to such a point that it is almost impossible for the occupants to see the screen. Windshield wipers help to some degree but require that the motor be kept running or, in the case of electric windshield wipers, create a drain on the battery. Furthermore, the use of windshield wipers is not entirely effective because the movement of the blade back and forth across the line of vision is somewhat distracting.

Various types of rain visors have been devised in the past for shielding the windshield during inclement weather. However, most of these have been very difficult to mount and to dismount as well as being quite bulky and therefore impractical to store in the automobile so that they will be available at all times. Furthermore, most of these rain visors have been rather expensive when considering that their only use is for viewing drive-in movies in the rain. A practical rain visor must be easily mounted and dismounted from the windshield and must be capable of being folded and packed into a small space within the automobile where it may be carried at all times. And, above all, the visor must not be too expensive and represent too great an investment.

Accordingly, it is an object of the present invention to provide an improved rain visor for an automobile windshield that may be quickly mounted and dismounted from the windshield of an automobile.

Another object of the present invention is to provide an improved rain visor for an automobile windshield that may be stored in a relatively small space, such as under the seat of an automobile.

It is another object of the present invention to provide an improved rain visor for an automobile windshield that is simple in construction and is relatively inexpensive as compared to known types of rain visors presently used on automobiles.

It is a further object of the present invention to provide an improved rain visor for an automobile windshield that may be quickly adjusted to fit the curve of all present day automobile windshields.

Further objects and advantages of the invention will become apparent as the following description proceeds and the features of novelty which characterize the invention will be pointed out with particularity in the claims annexed to and forming part of this specification.

Briefly stated, in accordance with the illustrated embodiment of the invention, there is provided a long rectangular piece of flexible waterproof or plastic material having arranged a short distance inwardly from each end thereof a longitudinal sleeve which extends substantially across the sheet of material. The longitudinal sleeves thereby divide the sheet into a pair of short wing sections arranged on opposite sides of a center section. In order to support the sheet of plastic material outwardly in cantilever fashion from the curved windshield of an automobile, there are provided a pair of supporting rods which are arranged on opposite sides of the windshield and extend outwardly at an angle therefrom. The supporting rods are provided with longitudinal outwardly extending sections that pass through the longitudinal sleeves in the strip of plastic material and support the material above the windshield. The end adjacent the windshield of each of the supporting rods is formed into a U-shaped section with one leg thereof connecting to the outwardly extending longitudinal section and the other leg thereof extending through the stem of a suction cup. The suction cups are attached to the upper portion of the windshield with the U-shaped sections of the rods on the inner sides thereof and with at least a portion thereof abutting against the windshield. The U-shaped section provides a fulcrum or lever arm around which the suction cup urges the supporting rod against the weight of the sheet material as it is extended outwardly in the cantilever fashion over the windshield. Because of the curved shape of the windshield, the innermost edge of the sheet of the flexible plastic material fits tightly against the windshield and prevents rain water from flowing down onto the windshield. The sheet material is provided with a drain hole positioned in the center portion thereof a short distance from the edge abutting the windshield for draining water which collects on the upper surface of the flexible sheet.

As a further aspect of the invention means are provided for holding the wing sections of the flexible sheet tightly downward thereby preventing flapping of these sections in a windstorm. These retaining means include cords extending from the corners of the wing sections to suction cups adapted for attachment to the hood or fenders of the automobile.

For a better understanding of the invention, reference may be had to the accompanying drawing in which:

Fig. 1 is a perspective view of an automobile windshield having the rain visor of the present invention positioned thereon;

Fig. 2 is a cross-sectional view taken along line 2—2 of Fig. 1;

Fig. 3 is a cross-sectional view taken along line 3—3 of Fig. 2;

Fig. 4 is a cross-sectional view taken along line 4—4 of Fig. 1; and

Fig. 5 is a view of the sheet of plastic material stretched out flatwise to indicate the general shape of the material and the arrangement of the longitudinal sleeves therein.

Referring now to Fig. 1 there is shown an automobile having a curved windshield upon which is mounted the rain visor of the present invention. The rain visor comprises a sheet of flexible waterproof or plastic material 2 and a pair of supporting rods 3 and 4 which support the sheet of material extended outwardly in cantilever or canopy fashion from the top of the windshield 5 of the automobile. It should be mentioned, that the automobile windshield 5 is of the curved type generally found on all automobiles in the past ten years. The supporting rods 3 and 4 hold the sheet of flexible material in stretched relationship with the forward edge 6 of the material held outwardly above the windshield 5 and with the rear edge 7 of the flexible sheet of material pulled tightly across the curved windshield.

As may be clearly seen in Fig. 5, the sheet of plastic material is in the general shape of a rectangle. Across the narrow width of the material and positioned inwardly from the edges 10 of the material are longitudinal sleeves 8 and 9 which divide the material into side wings 12 and 13 and a center section 11. As may best be seen in the cross-sectional view of Fig. 3, the sleeves 8 and 9 are formed by attaching long slender pieces 14 of flexible plastic material to the underside of the sheet 2. The longitudinal pieces 14 are attached to the sheet 2 only along their edge portions 15 so that the center portion of each piece 14 is free from the sheet 2. The pieces 14 may be attached in any manner well known in the art such as by use of a plastic adhesive and heat or by stitching with a thread, although this latter method is likely to cause a small amount of leakage along the sleeve. The longitudinal sleeves may also be made by folding the sheet of material back upon itself and joining portions of the sheet together a short distance from the fold so that the fold itself forms a longitudinal sleeve. The longitudinal sleeves 8 and 9 are preferably arranged slightly diagonally across the sheet of plastic material so that they extend at an angle inwardly from the rear edge 7 toward the front edge 6 of the material. As may be seen in Fig. 1, the support rods 3 and 4 extend through the sleeves 8 and 9 and the inward arrangement of these longitudinal sleeves assures that the front edge 6 of the sheet will be held taut by the support rods and that any rain water collecting on the surface of the flexible sheet will not drip or flow over this edge.

Each of the support rods 3 and 4 are formed of a single length of relatively stiff rod material which, for purposes of explanation, comprises two distinct sections; an outwardly extending support section 16, which fits into one of the longitudinal sleeves formed in the sheet material, and a U-shaped section, which lies adjacent the windshield of the automobile. The rod is more clearly shown in Figs. 2 and 3 of the drawing. As may be seen in Fig. 3, the U-shaped section comprises a pair of legs 18 and 19 and a cross piece 21 connected therebetween. Portions of the U-shaped section 17 abut against the windshield in a manner to be hereinafter explained and hold the support section 16 outwardly at an angle from the windshield. The outwardly extending sections 16 of each rod connects with what will be referred to for purposes of explanation in the remainder of the specification and claims as the inner or first leg 18 of the U-shaped section. The outer or second leg 19 of the U-shaped section of each rod extends through the stem 23 of a suction cup 22 which is attached to the windshield. Rod 4 is arranged with the second leg 19 of the U-shaped section on the right hand or outer side of the support section 16 while the rod 3 has the second leg 19 of its U-shaped section on the opposite side or on the left hand side (as seen in Fig. 1) of the supporting section of the rod. With the rods spaced in the above described manner on opposite sides of the windshield, the suction cups are arranged outwardly from the support sections 16 of each of the respective rods.

Referring now to Fig. 2, it can be seen that the connecting section 21 and the inner or first leg 18 of the U-shaped portion 17 are arranged so that they lie in the approximate plane of the edge 24 of the suction cup and thus abut against the windshield 5 whenever the suction cup 22 is attached to the windshield. In the preferred embodiment of the invention, this arrangement is provided by angling the second leg 19 away from the windshield and by forming an elbow 26 which permits the leg to be connected to the stem 23 of the suction cup 22 at approximately a right angle with respect to the axis of the stem. Thus, when the suction cup 22 is attached to the windshield, the connecting portion 21 and leg 18 of the U-shaped section 17 are "braced" against the surface of the windshield and thereby form a fulcrum or lever arm around which the suction cup 22 supports the weight of the flexible strip 2 of plastic material. It should be noted that an elbow 26 is not necessarily needed to make the connecting portion 21 and leg 18 lie against the windshield 5. Instead, the second leg 19 of the U-shaped member 17 could be arranged to pass through the stem 23 at an angle so that the connecting portion 21 and leg 18 would lie in the general plane of the edge 24 of the suction cup. However, in the preferred embodiment of the invention, it is desirable to pass the outer or second leg 19 through the stem 23 of the suction cup 22 at a generally perpendicular angle with respect to the axis of the stem 23 and thus permit a rather short length stem 23 to be utilized.

The above described rain visor is easily mounted on a windshield. The support sections 16 of the support rods 3 and 4 are first inserted into the respective longitudinal sleeves 8 and 9 of the sheet of plastic material and the rods are then placed in their approximate positions on the windshield with the rear edge 7 of the sheet 2 of material arranged just beneath the bead 27 on the upper portion of the windshield. The support rods 3 and 4 are generally spaced apart until slight tension is created in the rod members and the flexible sheet 2 of the material is held taut therebetween. The suction cups 22 are then attached to the windshield so that the leg 18 and the connecting portion 21 of each of the U-shaped sections are forced against the windshield thereby creating a moment of force around the respective U-shaped sections 17 of each of the rods 3 and 4 tending to support the outwardly extending sections 16 against the weight and tension of the sheet 2 of plastic material. Referring now to Fig. 3, it is apparent that the supporting section 16 of the rod 4, which is arranged within the longitudinal sleeve 9 of the sheet material 2, is pulled generally downwardly and to the left by the weight and tension of the sheet 2 of material. This creates a moment of force to the left around the U-shaped member 17 which is opposed by the moment of force created by the suction cup around the leg 18 which abuts against the windshield. It should be noted that the rod itself exerts a spring force or torsion force around the leg 18 of the U-shaped section. Inasmuch as the tension of the sheet 2 of material is generally exerted toward the left on the supporting section 16 as seen in Fig. 3, this force tends to rotate the inner or first leg 18 of the U-shaped section 17. This force is opposed by the built-in spring force or torsion force of the rod itself when retained in position against the windshield by the moment of force created by the suction cup and its lever arm which comprises the connecting portion 21.

Because of the curve in the windshield, the edge 7 of the flexible sheet 2 is held tightly against the windshield with portions of the sheet 2 of material folding over against the windshield. This is clearly illustrated in Fig. 4 in which the upper edge 7 of the sheet falls under the bead 27 of the windshield. Because of the curved shape of the windshield, there is formed in the sheet 2 of flexible plastic material stretched over the windshield, a depression or pocket 36 toward the rear edge 7 of the sheet 2. This depression 36 gets larger as one approaches the center of the windshield, and collects water impinging against the sheet of material and draining off the roof of the car. In order to prevent too much water from collecting in this portion of the rain visor, the weight of which could conceivably collapse the rain visor, there is provided a drain hole 37 in the center section 11 of the sheet of material arranged slightly inwardly from the rear edge 7 of the material. The drain hole 37 drains a small stream of water from the depression 36 down the center of the windshield. This small stream of water draining down the windshield covers only a very narrow section of the windshield in the center of the windshield and consequently does not interfere to any great extent with the vision of the occupants.

After the rain visor has been mounted in place on the windshield there are likely to be drops of rain on the windshield. This is easily removed by operating the windshield wipers to clear the windshield in the line of vision in front of the occupants of the automobile. The windshield wipers of some automobiles are relatively long and sometimes engage the U-shaped sections of the supporting rods 3 and 4. When this happens, the windshield wiper is likely to jump over the inner leg 18 of the U-shaped section and become trapped behind this leg of the U-shaped section. In order to prevent the windshield wiper from passing over the leg 18 of the U-shaped section there is provided a windshield wiper stop 42 which extends upwardly from the leg 18 and prevents the windshield wiper from jumping over the leg 18 and, thereby, prevents the entrapment of the windshield wiper.

The side wings 12 and 13 hang down over the supporting rods 3 and 4 and protect the windshield from rain being blown in under the visor from the sides. In order to prevent flapping of the side wings 12 and 13, means are provided for holding these wings tightly downward toward the hood or fenders of the automobile. These means include eyelets 28 and 29 formed in the front edge corners of the sheet 2 which are attached to cords 31 and 32 held tightly in the downward direction by suction cups 33 and 34 which are, in turn, attached to the hood of the automobile. Obviously, it is not absolutely essential to fasten the side wings down although this is certainly advantageous during wind storms which at times accompany a rain storm.

Since, at times during the rain storm, it is common to have gusts of wind, it is sometimes desirable to provide a downward retaining means for the center length of the sheet 2 of material similar to that used on the side wings and described above. Thus, in the preferred embodiment of the invention, there is shown an eyelet 38 through which a cord 39 is attached for retaining the forward edge 6 of the sheet downwardly against any gusts of wind which might have a tendency to lift the sheet away from the windshield. Cord 39 is held downwardly by a suction cup 40 also attached to the hood of the automobile.

Whenever the rain visor is dismantled, it is a simple matter to remove the supporting rods 3 and 4 from the longitudinal sleeves 8 and 9 to fold the flexible sheet 2 of plastic material so that it may be stored in a relatively small space. Actually, it has been found unnecessary to remove the supporting rods 3 and 4 from the material, but only necessary to remove the entire visor from the windshield by releasing the suction cups and then to roll the flexible plastic material into a cylindrical formation with the supporting rods arranged longitudinally therein. Thus folded, the rain visor can easily be stored away under the seat or in some likely storage space within the automobile.

By the present invention there has been provided a relatively easily mounted rain visor for an automobile windshield which is not only made out of inexpensive materials but is very easily folded and stored in a relatively small space within the automobile when not in use.

While in accordance with the patent statutes there has been described what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What I claim as new and desired to secure by Letters Patent of the United States is:

1. A rain visor for a curved automobile windshield comprising a rectangular sheet of flexible waterproof material, said material having longitudinal sleeves extending substantially the width of said material a short distance inward from each end thereof, means for retaining one edge of said flexible sheet of material tightly against the curved windshield with the remaining portions of said sheet stretched outwardly from said windshield, said means including a pair of spaced apart rod members each having a support section thereof extending outwardly from said windshield through said sleeves of said flexible sheet material and supporting said sheet material outwardly from said windshield, each of said rod members having the end thereof adjacent said windshield formed into a U-shaped section with one leg of said U-shaped section of each of said rod members connecting with said outwardly extending section of each of said rod members, a suction cup attached to the second leg of said U-shaped section of each of said rod members, said suction cups being attached to said windshield for retaining at least a portion of said U-shaped section of each of said support rods against said windshield so that said outwardly extending sections are braced against said windshield for supporting said sheet of flexible waterproof material.

2. A rain visor for a curved automobile windshield comprising a rectangular sheet of flexible waterproof material, said material having longitudinal sleeves extending substantially the width of said material a short distance inward from each end thereof, means for retaining one edge of said flexible sheet of material tightly against the curved windshield with the remaining portions of said sheet stretched outwardly from said windshield, said means including a pair of spaced apart rod members having support sections extending outwardly from said windshield through said sleeves of said flexible sheet material and supporting said sheet material outwardly from said windshield, each of said rod members having the end thereof adjacent said windshield formed into a substantially U-shaped section with the inner leg of said U-shaped section of each of said rod members connecting with said outwardly extending support section of said respective rod member, said U-shaped section of each of said rod members having a portion thereof abutting said windshield, and suction cups attached to the outwardly disposed legs of said U-shaped sections of said rod members, said suction cups projecting generally at right angles to said outwardly disposed legs of the U-shaped sections in the opposite direction from said outwardly extending support sections of said rod member for securing each of said rod members to said windshield and for creating a moment of force around said U-shaped sections to cause said outwardly extending sections of said U-shaped members to support said flexible material and to stretch said flexible material therebetween.

3. A rain visor for a curved automobile windshield comprising a rectangular sheet of flexible waterproof material, said waterproof material having a front edge adapted to extend outwardly from said windshield and a rear edge adapted to abut against said windshield, said material having longitudinal sleeves extending substantially the width of said material a short distance inwardly from each side edge thereof, said longitudinal sleeves being positioned diagonally upon said sheet of waterproof material with said openings to said longitudinal sleeves at the rear edge of said waterproof material being further apart than the openings of said longitudinal sleeves at the front edge of said waterproof material, means for retaining the rear edge of said flexible sheet of material tightly against the curved windshield with the remaining portion of said sheet stretched outwardly from said windshield, said means including a pair of spaced apart rod members having support sections extending outwardly from said windshield through said sleeves of said flexible sheet material and supporting said sheet material outwardly from said windshield, each of said rod members having the end thereof adjacent said windshield formed into a substantially U-shaped section with the inner leg of said U-shaped section of each of said rod members connecting with said outwardly extending support section of each of said rod members, said U-shaped section of each of said rod members having a portion thereof abutting said windshield and suction cups attached to the outwardly disposed legs of said U-shaped sections of said rod members, said suction cups projecting generally at right angles to said outwardly disposed legs of said U-shaped sections in the opposite direction from said outwardly extending support sections of said rod members for securing each of said rod members to said windshield for creating a moment of force around said U-shaped sections so that said outwardly extending portions of said U-shaped members support said flexible material and stretch said flexible material therebetween.

4. A rain visor for a curved automobile windshield comprising a rectangular sheet of flexible waterproof material, said material having longitudinal sleeves extending substantially the width of said material a short distance inward from each edge thereof, means for retaining one edge of said flexible sheet of material tightly against said curved windshield with the remaining portions of said sheet stretched outwardly from said windshield, said means including a pair of spaced apart rod members having supporting sections extending outwardly from said windshield through said sleeves of said flexible sheet material and supporting said sheet material outwardly from said windshield, each of said rod members having the end thereof adjacent said windshield formed into a substantially U-shaped section with the inner leg of said U-shaped section of each of said rod members connecting with said outwardly extending support section of said respective rod member, said U-shaped section of each of said rod members having a portion thereof abutting said windshield, suction cups attached to the outwardly disposed legs of said U-shaped sections of said rod members, said suction cups projecting generally at right angles to said outwardly disposed legs of said U-shaped sections in the opposite direction from said outwardly extending support section of said respective rod members for securing each of said rod members to said windshield and for creating a moment of force around said U-shaped sections to cause said outwardly extending sections of said U-shaped members to support said flexible material and to stretch said flexible material across said curved windshield, and a drain hole positioned inwardly a short distance from the rear edge of said flexible sheet material in the center portion thereof for draining water collecting on the top of said flexible sheet material when stretched tightly across the curved windshield.

5. A rain visor for a curved automobile windshield comprising a rectangular sheet of flexible waterproof material, said material having longitudinal sleeves extending substantially the width of said material a short distance inward from each end thereof, means for retaining one edge of said flexible sheet of material tightly against the curved windshield with the remaining portions of said sheet stretched outwardly from said windshield, said means including a pair of spaced apart rod members each having a support section thereof extending outwardly from said windshield through said sleeves of said flexible sheet material and supporting said sheet material outwardly from said windshield, each of said rod members having the end thereof adjacent said windshield formed into a substantially U-shaped section with one leg of said U-shaped section of each of said rod members connecting with said outwardly extending section of each of said rod members, a suction cup attached to the other leg of said U-shaped section of each of said rod members, each of said suction cups being attached to said windshield for retaining at least a portion of said U-shaped section of each of said support rods against said windshield so that said outwardly extending sections are braced against said windshield for supporting said sheet of flexible waterproof material, and a drain hole in said sheet of flexible material positioned inwardly from said edge of said material abutting said curved windshield and positioned in the central portion of said flexible sheet of material.

6. A rain visor for a curved automobile windshield comprising a rectangular sheet of flexible waterproof material, said material having longitudinal sleeves extending substantially the width of said material a short distance inward from each edge thereof, means for retaining one edge of said flexible sheet of material tightly against said curved windshield with the remaining portions of said sheet stretched outwardly from said windshield, said means including a pair of spaced apart rod members having support sections extending outwardly from said windshield through said sleeves of said flexible sheet material and supporting said sheet material outwardly from said windshield, each of said rod members having one end thereof adjacent said windshield formed into a substantially U-shaped section including an inner leg and an outer leg having a connecting piece therebetween, said inner leg of said U-shaped section of each of said rod members connecting with said outwardly extending support section of said respective rod members, said outer leg of said U-shaped sections being formed at an angle with respect to said inner leg and said connecting piece of said U-shaped section, suction cups having perpendicular stems attached to said U-shaped sections with the outer legs of said U-shaped sections extending through said stems, each of said suction cups having the edge thereof in approximately the same plane as the inner leg and connecting piece of said U-shaped sections of said rod members so that said inner leg and connecting piece of said U-shaped sections are braced against said windshield when said suction cups are attached to said windshield thereby providing a fulcrum around which said suction cups force said outwardly extending sections of said U-shaped members against the weight of said sheet of flexible material and water collecting thereon.

7. A rain visor for a curved automobile windshield comprising a rectangular sheet of flexible waterproof material, said sheet having longitudinal sleeves extending substantially the width of said material a short distance inward from each edge thereof and dividing said sheet into a center section and a pair of outwardly disposed wing sections, means for retaining one edge of said flexible sheet of material tightly against the curved windshield with said center section of said sheet stretched outwardly from said windshield, said means including a pair of spaced apart rod members having support sections extending outwardly from said windshield through said sleeves of said flexible sheet material and supporting said sheet material outwardly from said windshield with said wing sections of said sheet hanging downwardly over said support sections of said rod members, each of said rod members having the end thereof adjacent the windshield formed into a substantially U-shaped section with the inner leg of said U-shaped section of each of said rod members connecting with said outwardly extending support section of said respective rod members, said U-shaped sections of each of said rod members having a portion thereof abutting said windshield, suction cups attached to the outwardly disposed legs of said U-shaped sections of each of said rod members, said suction cups projecting generally at right angles to said outwardly disposed legs of said U-shaped sections in the opposite direction from said outwardly extending support sections of each of said rod members for securing each of said rod members to said windshield and for creating a moment of force in opposite directions around said respective U-shaped sections to cause said outwardly extending support sections to stretch said flexible material therebetween, and means attached to said wing sections of said flexible sheet, said means including suction cups attached to said hood of the automobile for anchoring said wing sections in the downward direction and preventing said wing sections from flapping during wind storms.

References Cited in the file of this patent

UNITED STATES PATENTS

| | | |
|---|---|---|
| D. 186,431 | Ottman | Oct. 27, 1959 |
| 1,851,770 | Johnson | Mar. 29, 1932 |
| 2,716,572 | Soucy | Aug. 30, 1955 |